United States Patent
Javed et al.

(10) Patent No.: US 12,491,642 B2
(45) Date of Patent: Dec. 9, 2025

(54) BEHAVIOR GENERATION FOR SITUATIONALLY-AWARE SOCIAL ROBOTS

(71) Applicant: Honda Motor Co., Ltd., Tokyo (JP)

(72) Inventors: Hifza Javed, San Jose, CA (US); Nawid Jamali, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 18/194,856

(22) Filed: Apr. 3, 2023

(65) Prior Publication Data
US 2024/0326256 A1    Oct. 3, 2024

(51) Int. Cl.
*B25J 11/00*    (2006.01)
*G06N 3/091*    (2023.01)

(52) U.S. Cl.
CPC ......... *B25J 11/0015* (2013.01); *B25J 11/001* (2013.01); *G06N 3/091* (2023.01)

(58) Field of Classification Search
CPC ..... B25J 11/0015; B25J 11/001; G06N 3/091; G06N 3/008; G06N 3/045; G06N 3/047; G06N 3/08; G06N 3/088
See application file for complete search history.

(56) References Cited

U.S. PATENT DOCUMENTS

| | | | | |
|---|---|---|---|---|
| 2018/0120843 A1* | 5/2018 | Berntorp | ............... | G06V 20/56 |
| 2018/0133900 A1* | 5/2018 | Breazeal | ............... | B25J 19/026 |
| 2019/0295305 A1* | 9/2019 | Yang | ............... | G06N 3/044 |
| 2019/0329402 A1* | 10/2019 | Cappello | ............ | G05B 19/0426 |
| 2021/0182663 A1* | 6/2021 | Galuten | ............... | G06N 5/04 |

OTHER PUBLICATIONS

Aly, A., & Tapus, A. (2016). Towards an intelligent system for generating an adapted verbal and nonverbal combined behavior in human-robot interaction. Autonomous Robots, 40(2), 193-209.

Cassell, J., Pelachaud, C., Badler, N., Steedman, M., Achorn, B., Becket, T., . . . & Stone, M. (Jul. 1994). Animated conversation: rule-based generation of facial expression, gesture & spoken intonation for multiple conversational agents. In Proceedings of the 21st annual conference on Computer graphics and interactive techniques (pp. 413-420).

Cassell, J., Vilhjalmsson, H. H., & Bickmore, T. (Aug. 2001). Beat: the behavior expression animation toolkit. In Proceedings of the 28th annual conference on Computer graphics and interactive techniques (pp. 477-486).

(Continued)

*Primary Examiner* — Michael C Zarroli
(74) *Attorney, Agent, or Firm* — Rankin, Hill & Clark LLP (57) ABSTRACT

According to one aspect, behavior generation for situationally-aware social robots may include generating a synthesized behavior based on a latent space representation indicative of a situational context including a situationally-aware social robot and one or more individuals, performing behavior retargeting on the synthesized behavior based on a real behavior from an initial latent space input to generate a retargeted behavior, and performing the retargeted behavior. The generating the synthesized behavior and the performing behavior retargeting may be implemented based on a generative adversarial network (GAN) based network. The GAN based network may be trained using a multimodal human behavioral dataset.

20 Claims, 6 Drawing Sheets

(56) References Cited

OTHER PUBLICATIONS

Chen, L., Cui, G., Liu, C., Li, Z., Kou, Z., Xu, Y., & Xu, C. (Aug. 2020). Talking-head generation with rhythmic head motion. In European Conference on Computer Vision (pp. 35-51). Springer, Cham.

Das, D., Biswas, S., Sinha, S., & Bhowmick, B. (Aug. 2020). Speech-driven facial animation using cascaded gans for learning of motion and texture. In European conference on computer vision (pp. 408-424). Springer, Cham.

Duarte, A. C., Roldan, F., Tubau, M., Escur, J., Pascual, S., Salvador, A., . . . & Giro-i-Nieto, X. (May 2019). WAV2PIX: Speech-conditioned Face Generation using Generative Adversarial Networks. In ICASSP (pp. 8633-8637).

Eskimez, S. E., Zhang, Y., & Duan, Z. (2021). Speech driven talking face generation from a single image and an emotion condition. IEEE Transactions on Multimedia.

Fang, Z., Liu, Z., Liu, T., Hung, C. C., Xiao, J., & Feng, G. (2022). Facial expression GAN for voice-driven face generation. The Visual Computer, 38(3), 1151-1164.

Gomez, R., Szapiro, D., Galindo, K., & Nakamura, K. (Mar. 2018). "Haru": Hardware Design of an Experimental Tabletop Robot Assistant. In 2018 13th ACM/IEEE International Conference on Human-Robot Interaction (HRI) (pp. 233-240). IEEE.

Goodfellow, I., Pouget-Abadie, J., Mirza, M., Xu, B., Warde-Farley, D., Ozair, S., . . . & Bengio, Y. (2020). Generative adversarial networks. Communications of the ACM, 63(11), 139-144.

Javed, H. (2021). Personalizing Mixed Initiative Dance Interactions with a Socially-Aware Robot (Doctoral dissertation, The George Washington University).

Li, L., Wang, S., Zhang, Z., Ding, Y., Zheng, Y., Yu, X., & Fan, C. (May 2021). Write-a-speaker: Text-based emotional and rhythmic talking-head generation. In Proceedings of the AAAI Conference on Artificial Intelligence (vol. 35, No. 3, pp. 1911-1920).

Lee, H. Y., Yang, X., Liu, M. Y., Wang, T. C., Lu, Y. D., Yang, M. H., & Kautz, J. (2019). Dancing to music. Advances in neural information processing systems, 32.

Oh, T. H., Dekel, T., Kim, C., Mosseri, I., Freeman, W. T., Rubinstein, M., & Matusik, W. (2019). Speech2face: Learning the face behind a voice. In Proceedings of the IEEE/CVF conference on computer vision and pattern recognition (pp. 7539-7548).

Park, C. Y., Cha, N., Kang, S., Kim, A., Khandoker, A. H., Hadjileontiadis, L., . . . & Lee, U. (2020). K-EmoCon, a multimodal sensor dataset for continuous emotion recognition in naturalistic conversations. Scientific Data, 7(1), 1-16.

Rawal, N., Koert, D., Turan, C., Kersting, K., Peters, J., & Stock-Homburg, R. (2022). ExGenNet: Learning to Generate Robotic Facial Expression Using Facial Expression Recognition. Frontiers in Robotics and AI, 8, 730317.

Rodriguez, I., Manfré, A., Vella, F., Infantino, I., & Lazkano, E. (Nov. 2018). Talking with sentiment: Adaptive expression generation behavior for social robots. In Workshop of Physical Agents (pp. 209-223). Springer, Cham.

Sun, G., Wong, Y., Cheng, Z., Kankanhalli, M. S., Geng, W., & Li, X. (2020). DeepDance: music-to-dance motion choreography with adversarial learning. IEEE Transactions on Multimedia, 23, 497-509.

Sutskever, I., Vinyals, O., & Le, Q. V. (2014). Sequence to sequence learning with neural networks. Advances in neural information processing systems, 27.

Suwajanakorn, S., Seitz, S. M., & Kemelmacher-Shlizerman, I. (2017). Synthesizing obama: learning lip sync from audio. ACM Transactions on Graphics (ToG), 36(4), 1-13.

Vougioukas, K., Petridis, S., & Pantic, M. (2018). End-to-end speech-driven facial animation with temporal gans. arXiv preprint arXiv:1805.09313.

Wen, Y., Raj, B., & Singh, R. (2019). Face reconstruction from voice using generative adversarial networks. Advances in neural information processing systems, 32.

Yoon, Y., Ko, W. R., Jang, M., Lee, J., Kim, J., & Lee, G. (May 2019). Robots learn social skills: End-to-end learning of co-speech gesture generation for humanoid robots. In 2019 International Conference on Robotics and Automation (ICRA) (pp. 4303-4309). IEEE.

Yu, C., & Tapus, A. (Dec. 2020). SRG 3: Speech-driven Robot Gesture Generation with GAN. In 2020 16th International Conference on Control, Automation, Robotics and Vision (ICARCV) (pp. 759-766). IEEE.

Zhou, Y., Han, X., Shechtman, E., Echevarria, J., Kalogerakis, E., & Li, D. (2020). Makelttalk: speaker-aware talking-head animation. ACM Transactions on Graphics (TOG), 39(6), 1-15.

* cited by examiner

BEHAVIOR GENERATION FOR SITUATIONALLY-AWARE SOCIAL ROBOTS

BACKGROUND

A social robot may be an artificial intelligence (AI) system that is designed to interact with humans and other robots. In the workplace, social robots have the potential to take over entire job functions, such as greeting and basic customer service. In the home, social robots could become functional enough to serve as a member of the family and be purposely designed with unique personalities and quirks to engage family members.

BRIEF DESCRIPTION

According to one aspect, a system for behavior generation for situationally-aware social robots may include a processor and a memory. The memory may store one or more instructions. The processor may execute one or more of the instructions stored on the memory to perform one or more acts, actions, and/or steps. For example, the processor may generate a synthesized behavior based on a latent space representation indicative of a situational context including a situationally-aware social robot and one or more individuals and perform behavior retargeting on the synthesized behavior based on a real behavior from an initial latent space input to generate a retargeted behavior.

The latent space representation may include a social setting, a cultural background, a state, a personality, a preference, or a demographic associated with one or more of the individuals. The generating the synthesized behavior and the performing behavior retargeting may be implemented based on a generative adversarial network (GAN) based network. The GAN based network may be trained using a multimodal human behavioral dataset. The synthesized behavior may include one or more of a facial expression, a head movement, a pose, or a gesture for the situationally-aware social robot. The real behavior may include one or more of a facial expression, facial landmarks, a head movement, a head rotation, a neck tilt, a pose, or a gesture. The generating the synthesized behavior may be performed by a generator including a temporal encoder and a temporal decoder. The performing the behavior retargeting may be performed by a discriminator. The processor may map the retargeted behavior to one or more portions of the situationally-aware social robot. The situationally-aware social robot may perform the retargeted behavior.

According to one aspect, a situationally-aware social robot may include a controller, an actuator, a processor, and a memory. The memory may store one or more instructions. The processor may execute one or more of the instructions stored on the memory to perform one or more acts, actions, and/or steps. For example, the processor may generate a synthesized behavior based on a latent space representation indicative of a situational context including a situationally-aware social robot and one or more individuals and perform behavior retargeting on the synthesized behavior to generate a retargeted behavior. The controller may control the actuator to perform the retargeted behavior.

The generating the synthesized behavior and the performing behavior retargeting may be implemented based on a generative adversarial network (GAN) based network. The GAN based network may be trained using a multimodal human behavioral dataset. The synthesized behavior may include one or more of a facial expression, a head movement, a pose, or a gesture for the situationally-aware social robot.

According to one aspect, a computer-implemented method for behavior generation for situationally-aware social robots may include generating a synthesized behavior based on a latent space representation indicative of a situational context including a situationally-aware social robot and one or more individuals and performing behavior retargeting on the synthesized behavior based on a real behavior from an initial latent space input to generate a retargeted behavior.

The generating the synthesized behavior and the performing behavior retargeting may be implemented based on a generative adversarial network (GAN) based network. The GAN based network may be trained using a multimodal human behavioral dataset. The synthesized behavior may include one or more of a facial expression, a head movement, a pose, or a gesture for the situationally-aware social robot. The real behavior may include one or more of a facial expression, facial landmarks, a head movement, a head rotation, a neck tilt, a pose, or a gesture. The generating the synthesized behavior may be performed by a generator including a temporal encoder and a temporal decoder.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "robot", as used herein, may be a machine, such as one programmable by a computer, and capable of carrying out a complex series of actions automatically. A robot may be guided by an external control device or the control may be embedded within a controller. It will be appreciated that a robot may be designed to perform a task with no regard to appearance. Therefore, a 'robot' may include a machine which does not necessarily resemble a human, including a vehicle, a device, a flying robot, a manipulator, a robotic arm, etc.

A "robot system", as used herein, may be any automatic or manual systems that may be used to enhance robot performance. Exemplary robot systems include a motor system, an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a suspension system, an audio system, a sensory system, among others.

Figure 1:
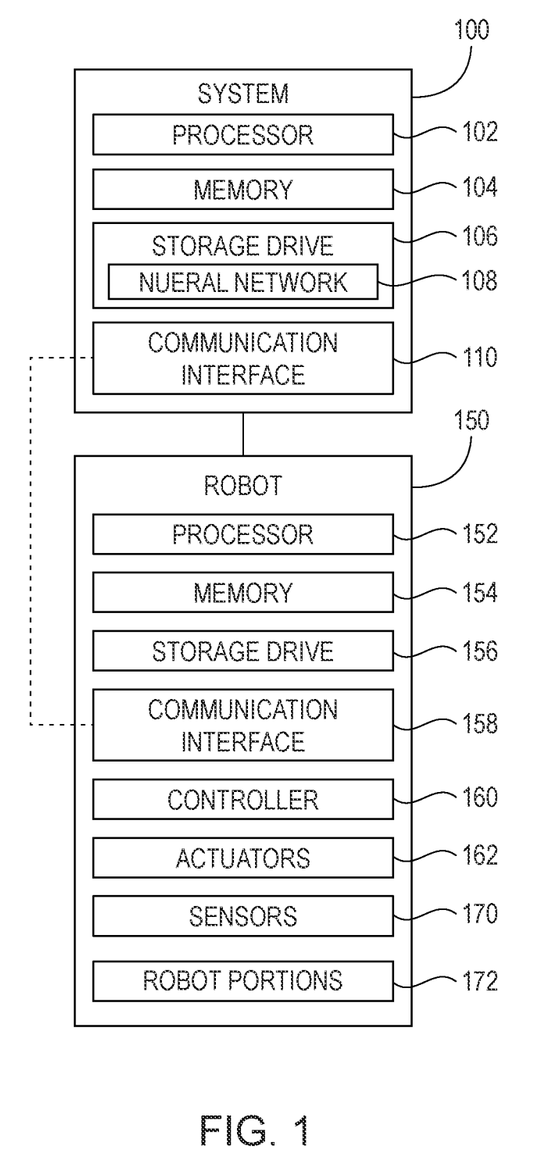
FIG. 1 is an exemplary component diagram of a system for behavior generation for situationally-aware social robots, according to one aspect.

FIG. 1 is an exemplary component diagram of a system 100 for behavior generation for situationally-aware social robots, according to one aspect. The system 100 for behavior generation for situationally-aware social robots may include a processor 102, a memory 104, a storage drive 106 storing a neural network 108, and a communication interface 110. The system 100 for behavior generation for situationally-aware social robots may be in computer communication or communicatively coupled to a robot, such as a situationally-aware social robot 150. The situationally-aware social robot 150 may include a processor 152, a memory 154, a storage drive 156, a communication interface 158, a controller 160, an actuator 162, sensors 170, and one or more robot portions 172.

According to one aspect, the system 100 for behavior generation for situationally-aware social robots may generate a trained model to be implemented on the situationally-aware social robot 150. According to another aspect, the situationally-aware social robot 150 may perform the training to develop its own trained model. In any event, the system 100 for behavior generation for situationally-aware social robots may include the processor 102 and the memory 104. The memory 104 may store one or more instructions. The processor 102 may execute one or more of the instructions stored on the memory 104 to perform one or more acts, actions, and/or steps.

Training

With respect to training the trained model, the processor 102 may receive a latent space representation which may be a model of situational context. The latent space representation may include a social setting, a location where the robot is situated, a cultural background, a state, a personality, a preference, or a demographic associated with one or more of the individuals.

The processor 102 may generate a synthesized behavior (e.g., which may be multi-modal) based on a latent space representation indicative of a situational context including the situationally-aware social robot 150 and one or more individuals. The synthesized behavior may include one or more of a facial expression, a head movement, a pose, or a gesture for the situationally-aware social robot 150. The generating the synthesized behavior may be performed by a generator including a temporal encoder and a temporal decoder. The temporal encoder may take this latent feature vector or latent space representation as the temporal encoder input and produce or generate a hidden space which becomes an input for the temporal decoder. The temporal decoder may use the hidden space to decode and thus generate an output that includes the synthesized behavior, such as facial line marks, hand movements, body poses, gestures, facial expressions, head movements, poses, etc. In this way, the generator may take the latent space representation of the situational context as an input. Explained another way, the discriminator may decide how close the synthesized behavior is to the original behavior that was supposed to be displayed. The discriminator may determine whether the synthesized behavior is real or fake and determine how close the synthesized behavior is to the actual behavior that should have displayed. Once the synthesized behavior is indiscriminateable, the trained model may be considered to be trained and the synthesized behavior may be utilized as an output for the trained model.

The processor 102 may perform behavior retargeting on the synthesized behavior based on a real behavior from an initial latent space input to generate a retargeted behavior. The synthesized behavior may be sent to a discriminator and the performing the behavior retargeting may be performed by the discriminator. The real behavior may include one or more of a facial expression, facial landmarks, a head movement, a head rotation, a neck tilt, a pose, or a gesture. The discriminator may predict whether these synthesized behaviors that were generated are in line with the situational context.

The generating the synthesized behavior and the performing behavior retargeting may be implemented based on a generative adversarial network (GAN) based network, which is a type of neural network. The GAN based network may be trained using a multimodal human behavioral dataset. For example, the K-EmoCon dataset, which contains audio and video recordings from multiple sessions of paired debates on a social issue between two individuals, may be utilized. In this way, the latent space representation or the model of situational context may be sent to a neural network 108. According to one aspect, the GAN may learn one or more appropriate spatial expressions, gestures, and poses which may be in line with the situational context. In this way, the situationally-aware social robot 150 may generate non-verbal social behaviors including facial expressions, head movements, full-body poses, and gestures, which may be expressive, natural-looking, and in line with the existing situational context within an interaction.

Figure 2:
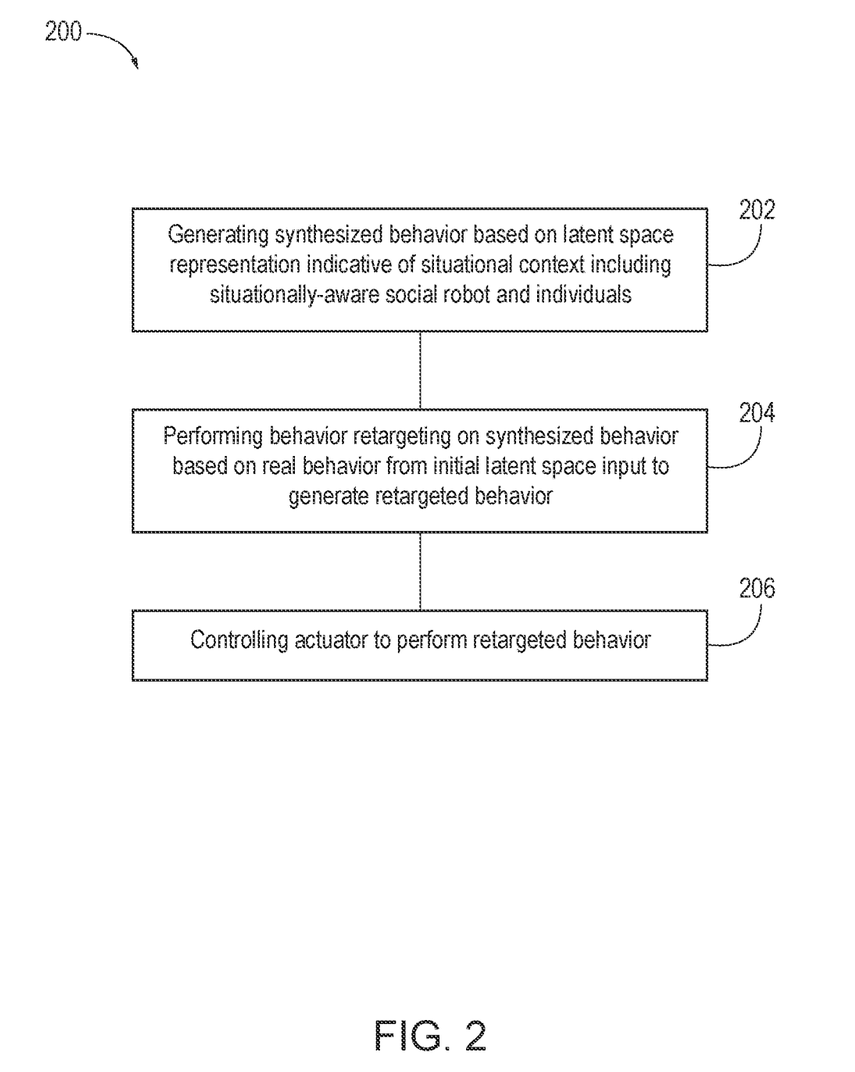
FIG. 2 is an exemplary flow diagram of a computer-implemented method for behavior generation for situationally-aware social robots, according to one aspect.

FIG. 2 is an exemplary flow diagram of a computer-implemented method 200 for behavior generation for situationally-aware social robots, according to one aspect. The computer-implemented method 200 for behavior generation for situationally-aware social robots may include generating 202 a synthesized behavior based on a latent space representation indicative of a situational context including the situationally-aware social robot 150 and one or more individuals, performing 204 behavior retargeting on the synthesized behavior based on a real behavior from an initial latent space input to generate a retargeted behavior, and controlling 206 an actuator 162 to perform the retargeted behavior.

Figure 3:
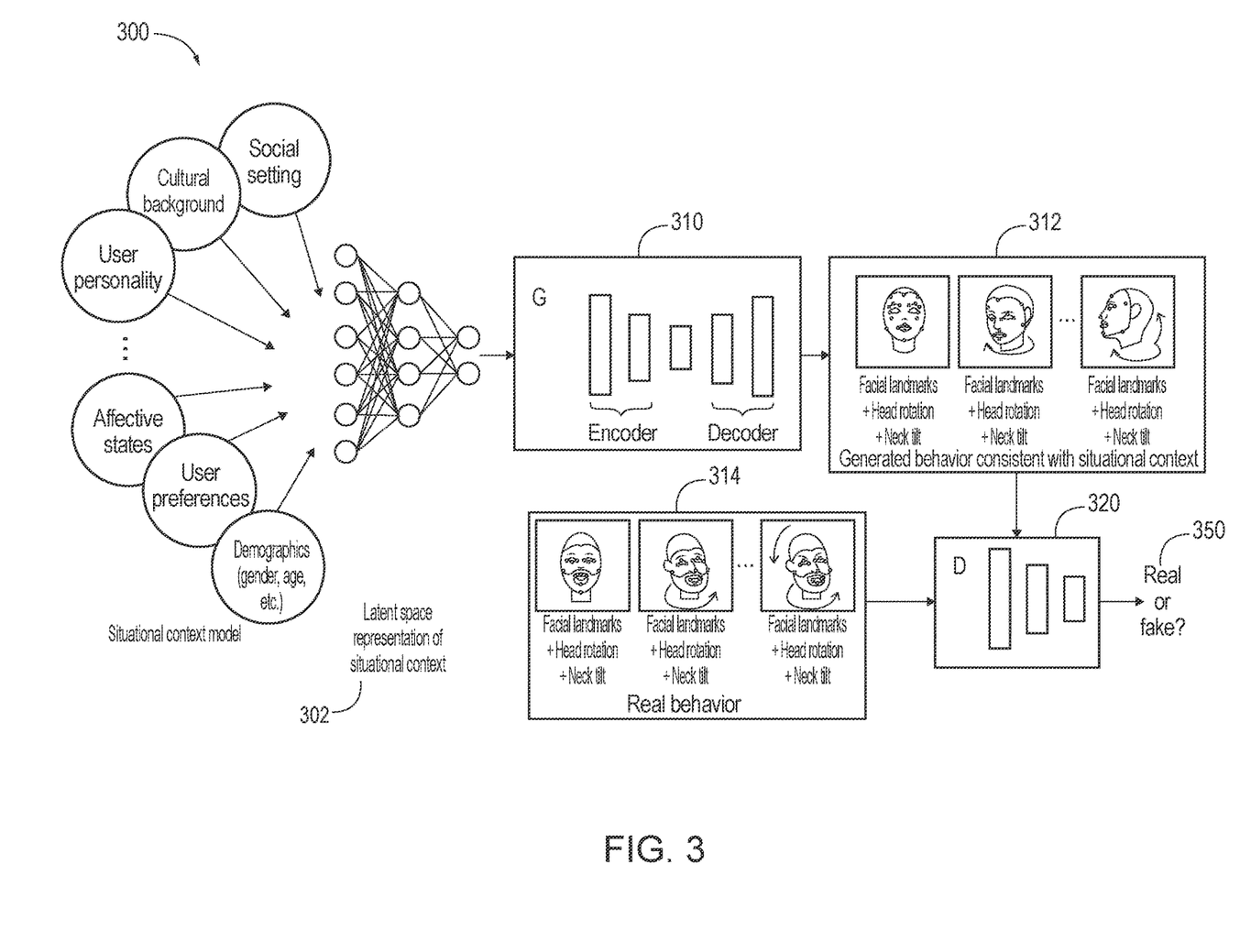
FIGS. 3-4 are an exemplary architectures in connection with the system for behavior generation for situationally-aware social robots of FIG. 1, according to one aspect.
Figure 4:
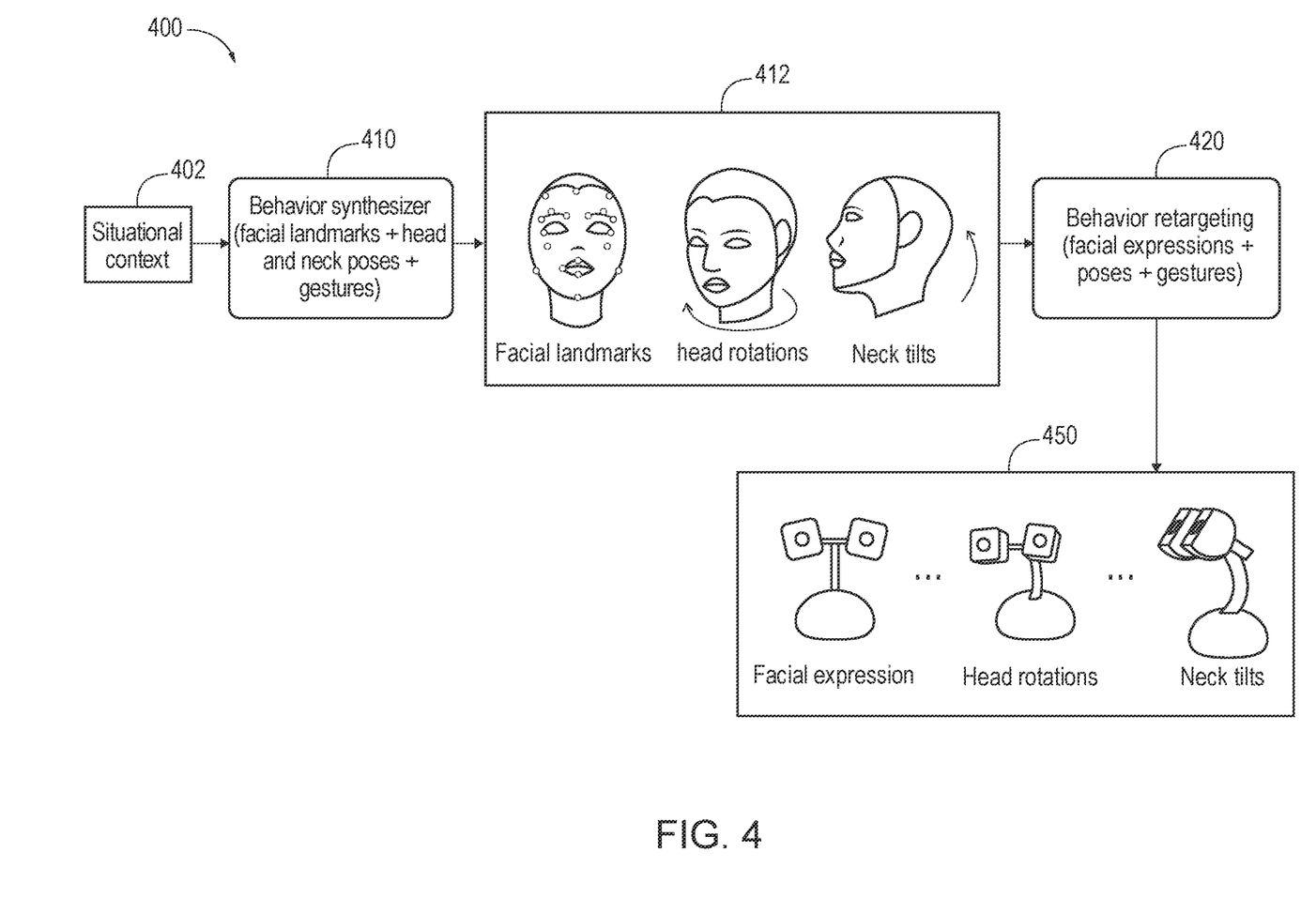

FIGS. 3-4 are an exemplary architectures 300, 400 in connection with the system 100 for behavior generation for situationally-aware social robots of FIG. 1, according to one aspect. FIG. 3 is an exemplary architecture 300 for training the system 100 for behavior generation for situationally-aware social robots where a latent space representation 302 of situational context may be input to the architecture 300. The temporal GAN architecture (including a generator 310, and a discriminator 320) used for the cross-modal generation of robot facial expressions, head rotation, and neck tilt behaviors from an input. The generator 310 may generate a synthesized behavior 312 based on the latent space representation 302 indicative of a situational context including the situationally-aware social robot 150 and one or more individuals. This synthesized behavior 312 and real behavior 314 from an initial latent space input may be fed to the discriminator 320 to determine whether the synthesized behavior 312 is sufficiently desirable.

FIG. 4 is an exemplary architecture 400 for implementing the system 100 for behavior generation for situationally-aware social robots, including a context-dependent behavior generation pipeline for the situationally-aware social robot 150.

A pipeline for the proposed cross-modal behavior synthesis through a generative method is shown in FIG. 4. A GAN-based network may synthesize facial expressions, head movements, full-body poses, and gestures from an input including latent features that represent the situational context. Multimodal behaviors may be retargeted and mapped onto the robot such that the expressions are well-aligned with a situational context within which the robot is to act.

Execution

According to one aspect, the situationally-aware social robot 150 may include the controller 160, the actuator 162, the processor 152, and the memory 154. The memory 154 may store one or more instructions, including the trained model. The processor 152 may execute one or more of the instructions stored on the memory 154 to perform one or more acts, actions, and/or steps according to the trained model. The sensor 170 on the situationally-aware social robot 150 may be an audio sensor, a visual sensor, a tactile sensor, etc. and may be equipped to read, sense, or detect one or more aspects related to one or more individuals, such as a facial expression, an age, a gender, an ethnicity, a state, a personality, a preference, a demographic, etc. associated with one or more of the individuals in the setting or environment. The sensor data and/or data received via the communication interface 158 of the situationally-aware social robot 150 may include situational context 402 data which may depict the environment and circumstances within which an interaction between either one or more individuals and the situationally-aware social robot 150 or between multiple humans and the situationally-aware social robot 150. This may be modeled by features describing the social setting, interactant demographics, personalities, and preferences of the interactants, individual and group-level affective states, etc. The processor 152 may incorporate a representation of these situational factors into the framework to produce behavioral output that is appropriate to the context of the interaction.

The behavior synthesizer 410 may be implemented via the processor 152, memory 154, storage drive 156, etc. of the situationally-aware social robot 150 and may generate a synthesized behavior 412 based on a latent space representation (e.g., which may be derived from the sensor data) indicative of a situational context including the situationally-aware social robot 150 and one or more individuals. In this way, the processor 152 or behavior synthesizer 410 may use a GAN-based network to produce sequences of multimodal behaviors (e.g., including facial expressions, head movements, full-body poses, and gestures) from an input latent feature vector that represents the current situational context derived from the sensor data and/or received via the communication interface 158 of the situationally-aware social robot 150 (e.g., preferences may be received via the communication interface 158 rather than via the sensors 170).

The processor 152 may perform behavior retargeting 420 on the synthesized behavior 412 to generate a retargeted behavior 450. The generated behaviors may be retargeted 420 for any situationally-aware social robot form factor and mapped onto the body of the situationally-aware social robot 150 or one or more of the robot portions 172. The retargeting 420 may vary depending on the embodiment of the robot and physical limitations associated with the situationally-aware social robot 150. These sequences of multimodal behaviors may enable the situationally-aware social robot 150 to express natural and emotional behaviors, which may be aligned with the current situational context within which the situationally-aware social robot 150 is acting, in order to enhance the impact of any interactions provided by the situationally-aware social robot 150.

For example, for a tabletop robot, the eye and lip landmarks may be reproduced in the form of animations that are displayed on the robot. The head and neck poses may be retargeted from the joint position space (x, y, z) to the joint angle space (pitch, roll, yaw). In this manner, the sequence of human facial expressions, head rotations, neck tilts, body poses, and gestures may be retargeted and mapped to the robot to display natural-looking expressions that correlate with the situational context within which the robot is behaving. In this way, the processor 152 may map the retargeted behavior 450 to one or more portions of the situationally-aware social robot 150. The controller 160 of the situationally-aware social robot 150 may control the actuator 162 of the situationally-aware social robot 150 to perform the retargeted behavior.

Further, using the sensed data, the situationally-aware social robot 150 may learn from continuous interactions with one or more of the individuals. In other words, the situationally-aware social robot 150 may modify the trained model over a period of time based on one or more interactions with one or more of the individuals. Thus, the trained model may be trained on the system 100 for behavior generation for situationally-aware social robots, transmitted, via communication interface 110 to communication interface 158 to the situationally-aware social robot 150, and updated as desired.

Figure 5:
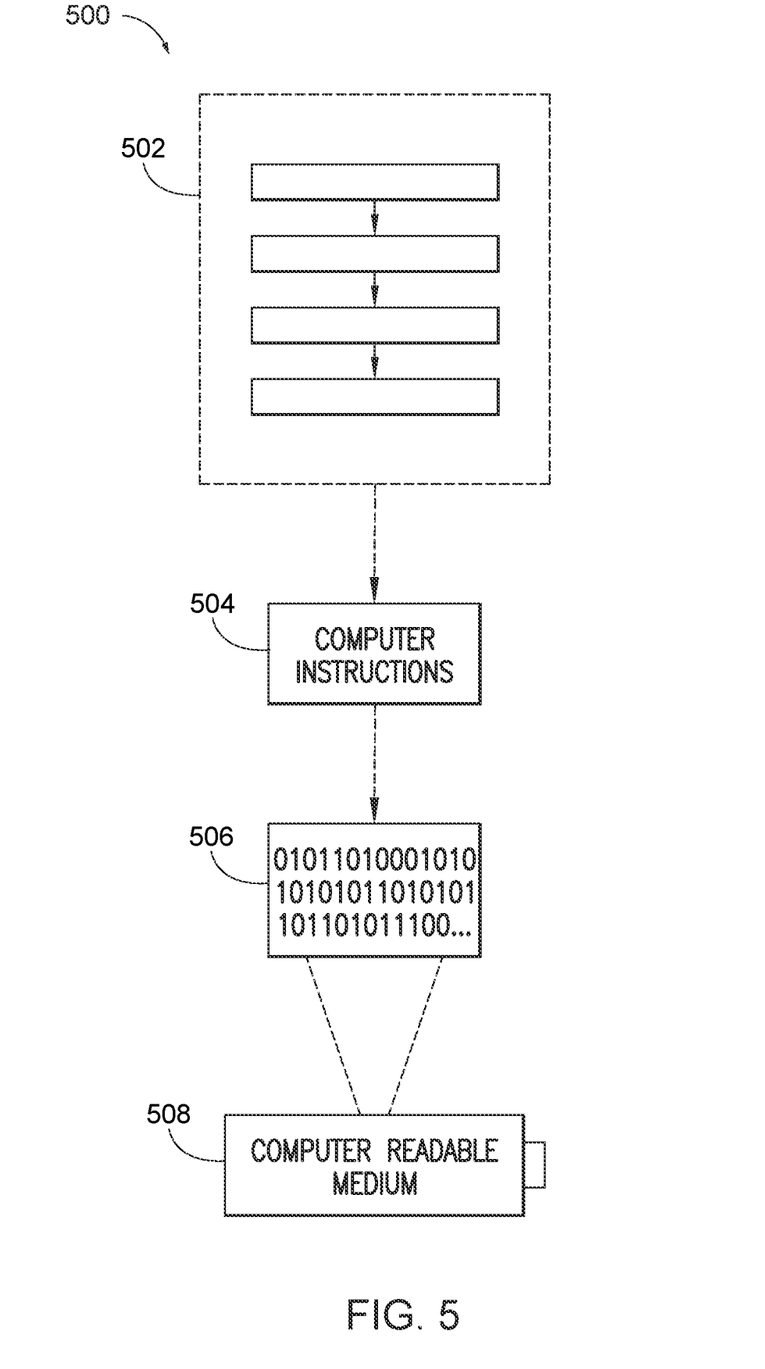
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the computer-implemented method 200 of FIG. 2. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
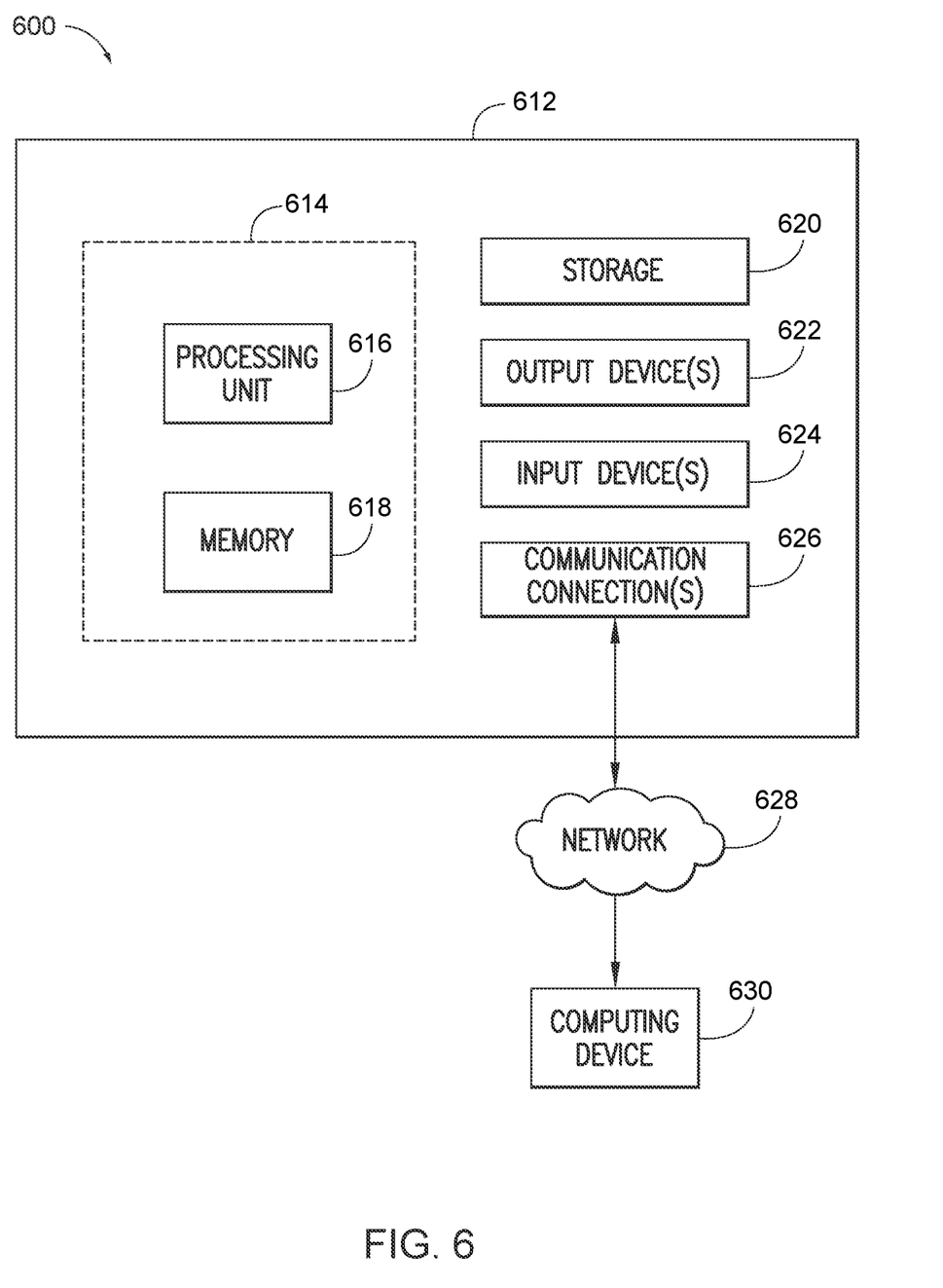
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by the at least one processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

The invention claimed is:

1. A system for behavior generation for situationally-aware social robots, comprising:
   a memory storing one or more instructions; and
   a processor executing one or more of the instructions stored on the memory to perform:
   generating a synthesized behavior based on a latent space representation indicative of a situational context between a situationally-aware social robot and one or more individuals; and
   performing behavior retargeting on the synthesized behavior based on a real behavior from an initial latent space input to generate a retargeted behavior.

2. The system for behavior generation for situationally-aware social robots of claim 1, wherein the generating the synthesized behavior and the performing behavior retargeting is implemented based on a generative adversarial network (GAN) based network.

3. The system for behavior generation for situationally-aware social robots of claim 2, wherein the GAN based network is trained using a multimodal human behavioral dataset.

4. The system for behavior generation for situationally-aware social robots of claim 1, wherein the synthesized behavior includes one or more of a facial expression, a head movement, a pose, or a gesture for the situationally-aware social robot.

5. The system for behavior generation for situationally-aware social robots of claim 1, wherein the real behavior includes one or more of a facial expression, facial landmarks, a head movement, a head rotation, a neck tilt, a pose, or a gesture.

6. The system for behavior generation for situationally-aware social robots of claim 1, wherein the generating the synthesized behavior is performed by a generator including a temporal encoder and a temporal decoder.

7. The system for behavior generation for situationally-aware social robots of claim 1, wherein the performing the behavior retargeting is performed by a discriminator.

8. The system for behavior generation for situationally-aware social robots of claim 1, wherein the latent space representation includes a social setting, a cultural background, a state, a personality, a preference, or a demographic associated with one or more of the individuals.

9. The system for behavior generation for situationally-aware social robots of claim 1, wherein the processor maps the retargeted behavior to one or more portions of the situationally-aware social robot.

10. The system for behavior generation for situationally-aware social robots of claim 1, wherein the situationally-aware social robot performs the retargeted behavior.

11. A situationally-aware social robot, comprising:
    a controller;
    an actuator;
    a memory storing one or more instructions; and a processor executing one or more of the instructions stored on the memory to perform:

generating a synthesized behavior based on a latent space representation indicative of a situational context between a situationally-aware social robot and one or more individuals; and performing behavior retargeting on the synthesized behavior to generate a retargeted behavior, wherein the controller controls the actuator to perform the retargeted behavior.

12. The situationally-aware social robot of claim 11, wherein the generating the synthesized behavior and the performing behavior retargeting is implemented based on a generative adversarial network (GAN) based network.

13. The situationally-aware social robot of claim 12, wherein the GAN based network is trained using a multi-modal human behavioral dataset.

14. The situationally-aware social robot of claim 11, wherein the synthesized behavior includes one or more of a facial expression, a head movement, a pose, or a gesture for the situationally-aware social robot.

15. A computer-implemented method for behavior generation for situationally-aware social robots, comprising:

generating a synthesized behavior based on a latent space representation indicative of a situational context between a situationally-aware social robot and one or more individuals; and performing behavior retargeting on the synthesized behavior based on a real behavior from an initial latent space input to generate a retargeted behavior.

16. The computer-implemented method for behavior generation for situationally-aware social robots of claim 15, wherein the generating the synthesized behavior and the performing behavior retargeting is implemented based on a generative adversarial network (GAN) based network.

17. The computer-implemented method for behavior generation for situationally-aware social robots of claim 16, wherein the GAN based network is trained using a multi-modal human behavioral dataset.

18. The computer-implemented method for behavior generation for situationally-aware social robots of claim 15, wherein the synthesized behavior includes one or more of a facial expression, a head movement, a pose, or a gesture for the situationally-aware social robot.

19. The computer-implemented method for behavior generation for situationally-aware social robots of claim 15, wherein the real behavior includes one or more of a facial expression, facial landmarks, a head movement, a head rotation, a neck tilt, a pose, or a gesture.

20. The computer-implemented method for behavior generation for situationally-aware social robots of claim 15, wherein the generating the synthesized behavior is performed by a generator including a temporal encoder and a temporal decoder.

* * * * *